United States Patent
Katzke et al.

(10) Patent No.: US 8,137,559 B2
(45) Date of Patent: Mar. 20, 2012

(54) LIQUID CLARIFICATION

(75) Inventors: Michael Katzke, Freiburg (DE); Ola Lind, Uppsala (SE); Tobias Soderman, Uppsala (SE); James Van Alstine, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 412 days.

(21) Appl. No.: 12/523,322

(22) PCT Filed: Jan. 28, 2008

(86) PCT No.: PCT/SE2008/000073
§ 371 (c)(1),
(2), (4) Date: Jul. 16, 2009

(87) PCT Pub. No.: WO2008/097154
PCT Pub. Date: Aug. 14, 2008

(65) Prior Publication Data
US 2010/0028505 A1  Feb. 4, 2010

(30) Foreign Application Priority Data
Feb. 9, 2007 (SE) ...................... 0700334

(51) Int. Cl.
*B01D 15/08* (2006.01)
(52) U.S. Cl. ..... 210/635; 210/656; 210/679; 210/198.2; 210/502.1; 426/271; 426/330.3; 426/330.4; 426/422
(58) Field of Classification Search ................ 210/635, 210/656, 679, 198.2, 502.1; 426/271, 330.3, 426/330.4, 422
See application file for complete search history.

(56) References Cited

U.S. PATENT DOCUMENTS

| 3,878,310 A * | 4/1975 | Field et al. ..................... 426/422 |
| 6,001,406 A | 12/1999 | Katzke et al. |
| 2005/0065282 A1 * | 3/2005 | Ihre et al. ..................... 525/54.1 |
| 2006/0249457 A1 * | 11/2006 | Van Alstine et al. .......... 210/656 |
| 2010/0028505 A1 * | 2/2010 | Katzke et al. ................. 426/271 |

FOREIGN PATENT DOCUMENTS

| WO | WO 99/60090 | 11/1999 |
| WO | WO 02/102960 | 12/2002 |
| WO | WO 03/046063 | 6/2003 |
| WO | WO 2004/082801 | 9/2004 |
| WO | WO 2005/029065 | 3/2005 |

OTHER PUBLICATIONS

Asano, K., et al., "Characterization of Haze-Forming Proteins of Beer and Their Roles in Chill Haze Formation", American Society of Brewing Chemists Journal, vol. 40, No. 4 (1982) p. 147-154.

Haslam, E., "Practical Polyphenolics—From structure to molecular recognition and physiological action" Cambridge University Press (1998) p. 163-165.

Hjerten, S., "The Preparation of Agarose Spheres for Chromatography of Molecules and Particles", Biochimica et Biophysica Acta, 79 (1964) p. 393-398.

(Continued)

*Primary Examiner* — Ernest G Therkorn

(57) ABSTRACT

The present invention relates to liquid clarification. More closely, the invention relates to beverage clarification, such as reduction of colloidal (not microbial) haze-causing substances in beer or related beverages such as wine, juices, flavorings etc. The method of the invention uses a hydrophilic surface for adsorption of haze-forming substances by hydrogen bonding interaction properties between the surface and the haze-forming substances.

17 Claims, 3 Drawing Sheets

OTHER PUBLICATIONS

Jany, A., et al., "CSS—A New Beer Stabilization Process", Technical Quarterly, Master Brewer's Association of Americas, vol. 39, No. 2 (2002) p. 96-98.

Jany, A., "Combined Stabilization System", Brewing and Beverage Industry International, No. 3 (2003) p. 18-20.

Rempp, P., et al., "Synthesis of Graft Copolymers", Comprehensive Polymer Science, vol. 6 Polymer Reactions, Eastmond, G., et al., editors (1989) p. 403-421.

Siebert, K., et al., "Comparison of Polyphenol Interactions with Polyvinylpolypyrrolidone and Haze-Active Protein", American Society of Brewing Chemists Journal, vol. 56, No. 1 (1998) p. 24-31.

* cited by examiner

LIQUID CLARIFICATION

CROSS-REFERENCE TO RELATED APPLICATIONS

This application is a filing under 35 U.S.C. §371 and claims priority to international patent application number PCT/SE2008/000073 filed Jan. 28, 2008, published on Aug. 14, 2008, as WO 2008/097154, which claims priority to patent application number 0700334-6 filed in Sweden on Feb. 9, 2007.

FIELD OF THE INVENTION

The present invention relates to liquid clarification. More closely, the invention relates to beverage clarification, such as reduction of colloidal (not microbial) haze-causing substances in beer or related beverages such as wine, juices, flavorings etc. The method of the invention uses a hydrophilic surface for adsorption of haze-forming substances by hydrogen bonding interaction properties between the surface and the haze-forming substances.

BACKGROUND OF THE INVENTION

In the example of commercial beer production it is typically necessary to reduce the relative concentrations of haze forming compounds in order to prevent the non-microbiological or colloidal "haze" which results from the formation of macroscopic molecular assemblies of polyphenol (sometimes called tannin) compounds and polypeptides. Such colloidal haze formation can affect the drinking experience, is unattractive to consumers (who associate it with microbiological haze) and limits the commercial storage life of beer. Haze forming compounds are often removed by bulk addition of "fining agents" such as hydrophilic silica hydrogel (silica) which binds interacting polypeptides and polyvinylpolypyrrolidone (PVPP) and similar products (such as the commercial agent Polyclar AT) which bind polyphenols. These agents are mixed with the beer and then removed from it by decanting/filtration or similar processes. Similar haze reducing methods and procedures have been known and used for hundreds of years.

The literature on treatment of beer to reduce haze formation offers little consensus on exact mechanisms responsible for haze formation (1, 2). In truth, the relative importance of different mechanisms may vary from beer to beer, brewery to brewery, and with different conditions such as storage temperature. However it does appear that haze is formed via micro and then macroscopic assembly formation based on interaction of proteins and polyphenols. Some (e. g., proline-rich) proteins and some (e. g. dimeric favan-3-ol) polyphenols may be more prone to haze formation than other proteins and phenols. Significant haze formation appears to be somewhat of a time-dependent and thus stochastic process. As such its reduction to consumer desired levels can be obtained by various routes including reducing general concentrations of the proteins or polyphenols, or both proteins and polyphenols involved in haze formation. Naturally what is more to be desired is reduction of the specific protein, polyphenol, or both protein and polyphenol compounds which are more prone to produce haze formation (1, 2). That outcome is desired as it results in less reduction in natural beverage constituents.

U.S. Pat. No. 6,001,406 describes a method for stabilizing a beverage containing haze causing substances. This patent relates to a method for the simultaneous removal of polyphenols and proteins from a beverage by contacting the beverage with an ion exchanger that is capable of adsorbing both types of substances. The characteristic feature of the ion exchanger to be used is that it is a water insoluble porous hydrophilic matrix to which ion exchanging groups are covalently bound. Preferably, Q SEPHAROSE™ Big Beads (QBB) from GE Healthcare Bio-Sciences AB are used to remove colloidal haze precursors. The goal of the process is only to remove enough precursors to eliminate significant haze formation; not to remove all the haze promoting precursors as they may also confer head-foam formation, flavour tones and other favourable properties on the beer. The QBB-based system may offer several advantages over use of fining agents including increased beer storage life, elimination of the (perceived non-ecologically friendly) need to add and then discard additives, elimination of concerns related to possible inability to recover all added substances, plus use of more biocompatible and natural materials (e. g., agarose versus PVPP). The limitations with this technique are the cost of the Q-ligand modified agarose BB, that Q-modified media may show greater tendency to irreversibly adsorb protein and other beer constituents (i. e. foul) than for example media which does not contain charged ligands, the cost of chemical and other agents for cleaning in place (CIP) and that the QBB bed must be changed when or if it becomes fouled to a degree not amenable to CIP treatment.

SUMMARY OF THE INVENTION

The present inventors have found that in some cases ion exchange media may not effectively reduce (proline-rich) proteins or polypeptides from haze forming beverages. This led the inventors to conclude that desired reduction in haze formation may be primarily achieved by reduction of polyphenols. They have also shown that it appears possible to reduce haze forming polyphenols using only a hydrophilic surface to be contacted with the haze forming liquid, such as untreated beer. In contrast to prior art, the present invention does not rely on an ion exchanger for removal of both protein and polyphenol haze forming substances. Thus an ion exchanger matrix, as for example taught in U.S. Pat. No. 6,001,406, while being useful for beer haze reduction, is not the only hydrophilic matrix capable of interacting with and reducing beverage concentrations of haze forming polyphenols. The removal can be effected by the simple use of a hydrophilic matrix without ion exchange ligands. The present inventors have discovered that favourable results are related to such haze promoting substances also interacting with the matrix via hydrogen bonding.

It has previously been scientifically known that materials based on bacterial polysaccharide (dextran) can generally interact with polyphenols by a manner thought to relate to hydrogen bond formation (3). However it is a surprising discovery to find that agarose materials, manufactured from polysaccharides derived from plants (seaweed) not bacteria, not only bind polyphenols but also show some preference for (dimeric) polyphenols similar to those compounds thought to promote beverage haze formation.

Thus, in a first aspect the invention relates to a method for reducing haze formation in a liquid comprising reduction of haze forming substances via hydrogen bonding—an example being removal of haze formation promoting polyphenols from said liquid by contacting said liquid with a surface or separation matrix molecularly interacting with polyphenols by hydrogen bonding.

Preferably, the separation matrix comprises a polymeric support comprising hydrogen bond forming media, wherein at least the surface of the support is substantially hydrophilic.

The polymeric support may be a carbohydrate support such as a crosslinked carbohydrate support such as agarose (e. g. SEPHAROSE™) or dextran (e. g. SEPHADEX™).

The polymeric support may comprise polyvinyl pyrrolidone, PVPP.

Preferably, the support is porous or otherwise constructed to offer significant solution to surface contact area so as to promote effective adsorption of enough haze forming substances as to significantly reduce haze formation during storage under a variety of conditions.

Thus the separation matrix or surface preferably comprises beads, a membrane or a filter. These surfaces may comprise agarose, dextran, or surfaces offering similar hydrogen bonding and polyphenol binding properties. In one embodiment, especially when the separation matrix is a filter, the separation matrix has combined hydrogen bonding and filtration capability.

In a preferred embodiment, the hydrogen-bonding groups contain lone-pair electrons and are based on polymers or other ligands containing, for example, hydroxyl groups, ether groups, carboxyl groups, carbonyl groups, amine groups. Under different conditions some of these groups are capable of hydrogen bond proton accepting and donating. The polymer chains could utilise acrylic acid or poly(acrylic acid) (PAA) or similar monomeric or polymeric acid ligands found, for example, on CM SEPHAROSE™ or on media modified with PM to form what might be called polyCM-SEPHAROSE™, described in WO2005/029065.

In a most preferred embodiment the hydrogen bonding media comprises ether-containing-ligands, in high enough surface concentration to be effective, which might suggest use of hydrophilic polyether based coatings. Examples of the latter include polyether coatings produced by grafting polymers such as poly(ethylene glycol) onto media, or polymerising monomers such as diethylene glycol vinyl ether onto various based matrices. The latter was used in FIG. 3 where the coating was produced using diethylene glycol vinyl ether reagent and reactive vinylether radical grafting per WO2005/029065. Base matrices for such coatings might include SEPHAROSE™ (per FIG. 3) or a variety of other chromatography base matrices or monoliths chosen in regard to other application related needs.

In the example shown in FIG. 3 the SEPHAROSE™ base matrix might be expected to offer additional polyphenol binding capability (FIG. 1). Thus, the invention also relates to use of hydrogen bonding ligands alone or in combination with other hydrogen bonding media or ligands for liquid clarification, preferably clarification of beer.

The polymer chains might also utilise polyethers such as poly(ethylene glycol) or PEG or various other polymers or substances (ligands, surfactants) whose composition includes polyethers. PEG coated media exist but their possible use for reduction of haze forming substances in beer appears to not have been disclosed previously.

The interacting surfaces could also involve use of various hydrogen bonding substances such as ethylene glycol or Tris containing reagents. The hydrogen bonding groups may also comprise a responsive polymer, such as a temperature or pH responsive polymer.

The liquid to be clarified may be selected from a beverage selected from beer, wine, juice or flavourings.

Preferably the liquid is beer and the separation matrix comprises agarose-based chromatography beads, such as SEPHAROSE™ BB, CM SEPHAROSE™. The chromatography beads may also comprise PEG-coated beads. An example is SEPHAROSE™ BB which is a cross-linked porous particles of agarose produced in large enough particle and particle pore sizes to effect good separation at relatively rapid flows of beverage feed. Such SEPHAROSE™ BB might be enhanced via modification with various hydrogen bonding reagents, ligands or polymers such as those noted above.

DETAILED DESCRIPTION OF THE INVENTION

Figure 1:
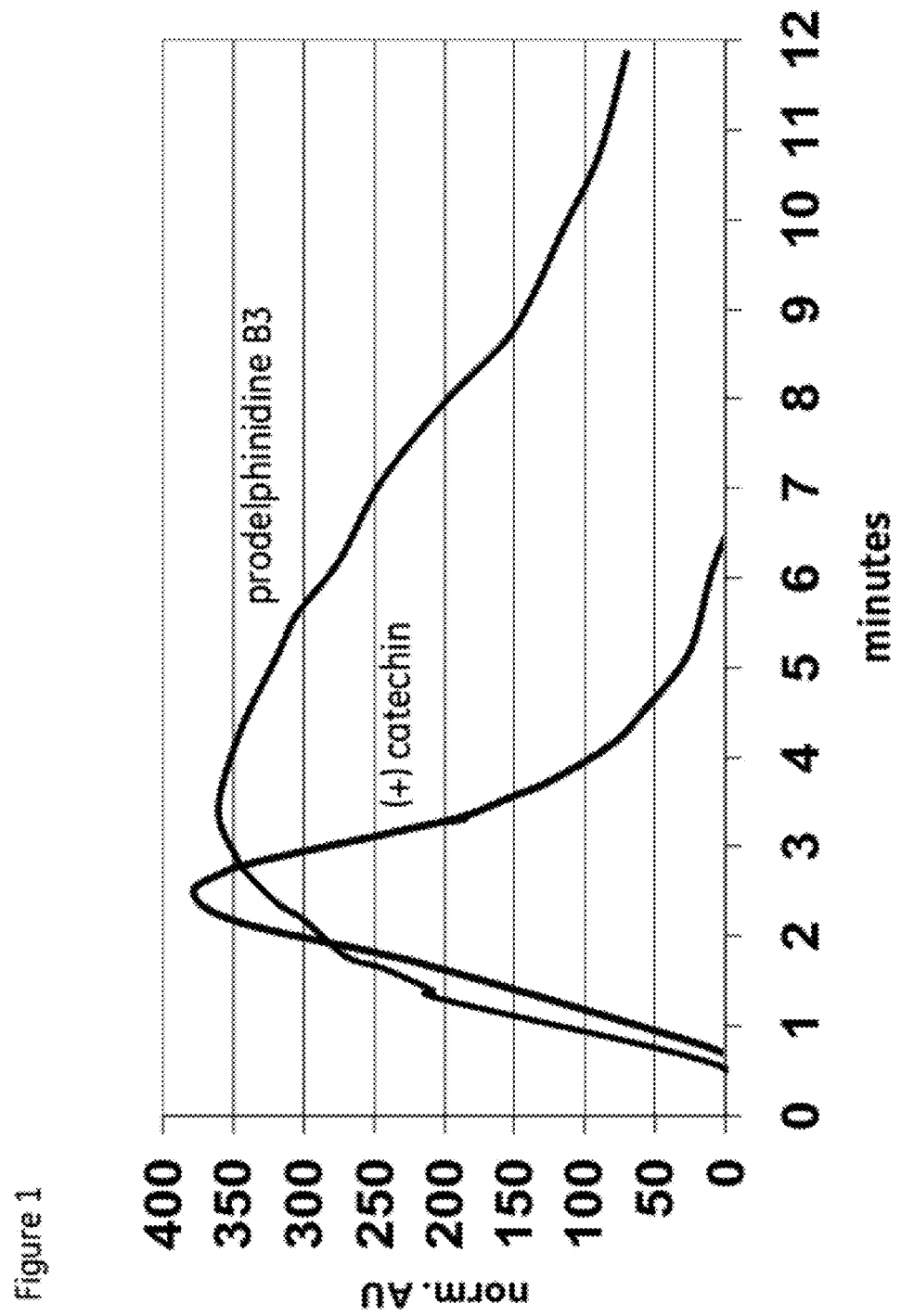
FIG. 1 shows retardation of the same model haze forming model polyphenol substances on SEPHAROSE™ Big Bead media. (+) Catechin elutes at 4 CVs whereas Prodelphinidine-B3 elutes at 7 CVs.

Separation media modified with charged ion exchange ligands has been known for reduction of haze formation in beverages. The present inventors have found that the presence of ion exchange groups may not be necessary for reduction of haze forming substances in different beverages such as beer. Laboratory experiments suggest that simple "unmodified" polysaccharide based chromatography media, i.e. without any ion exchange ligands, such as agarose media, appears able to provide the necessary molecular interactions including both (a) favorable interaction with polyphenols and (b) somewhat selective interaction in terms of more favourable interaction with dimeric polyphenols. Such interactions appear to have nothing to do with the chromatographic nature of the particulate media studied but merely on the related interactions at the molecular level. Similar interactions would be expected from filters, solid surfaces, monolithic separation media, etc. Thus any analogous surface would be expected to illicit such results. This media appears to interact with the haze causing substances by Hydrogen bond interaction. This suggests that (i) a wide variety of media types might be used for haze reduction (i. e. beverage stabilisation) purposes, (ii) some useful media types, including "base" media which is not secondarily modified with ion exchange or other ligands or coatings, may be less expensive to produce than the QBB or other media currently employed for beverage stabilisation, (iii) some useful media may offer less charged or otherwise varied surface properties which reduce non-specific fouling of the matrices and thus the need for cleaning-in-place or media replacement over time.

In addition to separation particles or other surfaces based on agarose, other hydrogen bond forming (e. g. polyhydroxy or polyether containing base matrix types or coated) media may offer similar interactions including SEPHADEX™ base matrices as well as various forms of poly(ethylene glycol) or PEG or PVP or PVPP or Dextran (XL) coated media or media coated with acids (e. g. CM-SEPHAROSE™) or newer hydrogen bonding coatings (e. g. prototype PolyCM media produced from reactive vinylether radical grafting per WO05/029065) or polyether media or other mixed mode media. It should be noted that FIGS. 1 to 3 indicate the ability of media containing different hydrogen bond forming ligands to function.

Thus, in one embodiment, the hydrogen bonding groups which occur naturally on the polymer used to construct the base matrix constitute the ligands, which are capable of interaction via hydrogen bonding to any target that presents available interacting groups. The interacting groups (e. g. proton-accepting in the case of polyethers or carbonyls) appear as repeated units i.e. recurring units of a polymer chain. Further, the wording recurring "on polymer chains" is used herein to make clear that the proton-donating or -accepting groups can be coupled to or part of polymer chains, which in turn are coupled to the surfaces of support. A skilled person in this field will realise, the functional groups can be attached to linear and/or branched polymers, or any other kind of polymeric network which can be an integral part, or surface coating part, or surface extending coating part of the interacting material.

In another embodiment the interacting polymer could be a responsive polymer such as the self-associating, acid group and hydrogen bonding group containing, polymers and polymer coatings detailed in WO2004/082801 and other patents and publications related to responsive polymers.

The support can be made from any organic or inorganic material. The support may be solid, e.g. for use in expanded bed adsorption, or porous, as often used in liquid chromatography. In an advantageous embodiment, the support is porous. In the context of porous supports, it is noted that the term "surface" refers to both the outer surface of the support and to pore surfaces. Accordingly, the support may be in the form of particles, such as essentially spherical particles, monoliths, membranes, chips, and surfaces.

Thus, the support may be a carbohydrate support, which may be any carbohydrate material as conventionally used for supports in separation methods, such as chromatography or filtration. In one embodiment, the support is comprised of a cross-linked carbohydrate material, such as agarose, agar, cellulose, dextran, chitosan, konjac, carrageenan, gellan, and alginate. In the most preferred embodiment, the matrix is porous cross-linked agarose. The carbohydrate support of the invention is easily prepared by the skilled person in this field in accordance with standard methods, such as inverse suspension gelation (4). Alternatively, the support is based on a commercially available product, such as SEPHAROSE™ Big Beads (BB) a porous cross-linked agarose gel from GE Healthcare Bio-Sciences AB, Uppsala, Sweden, which product is used as such or subsequently modified to attach hydrogen bonding groups in accordance with standard methods.

In the application of the invention, binding via hydrogen bonding occurs when the ligand or interacting molecules on the binding surface bind to the target via the sharing of a proton and lone pair electrons. Thus release is expected to be facilitated when the proton or electron donating groups are otherwise altered so as to not be capable of their interaction. An example of the latter includes deprotonation of a proton donating group.

In an alternative embodiment of the present invention, the support of the matrix is a surface-modified synthetic polymer support, wherein the surfaces exhibit hydrogen bonding groups due to their natural chemistry, or to surface modification. Such a synthetic polymer support may be any suitable polymer, preferably a crosslinked synthetic polymer, such as styrene or styrene derivatives, divinylbenzene, acrylamides, acrylate esters, vinyl esters, vinyl ethers, vinyl amides etc, as will be discussed in more detail below, and is easily prepared by the skilled person in this field. In an advantageous embodiment, the surface-modified synthetic polymer of the invention is cross-linked styrene and/or divinyl benzene. Further, in a specific embodiment, the present polymer chains have been coupled to the support via double bonds and epoxides, as will be discussed in more detail below.

As appears from the above, in one embodiment, the support of the present separation matrix is porous. In this context, the term surface refers to the pore surfaces as well as to the outer surfaces of the support.

As regards the hydrogen bonding groups present on the support according to the invention, i.e. the functional groups of the present separation matrix, the skilled person will realise that polymer materials or coatings offer the possibility to have very high densities of interacting groups and enhance the effectiveness of the product via presentation of more interacting groups as well as their modification of local interacting surface environment (e. g. local solution pH, polarity and conductivity). In an advantageous embodiment, the functional groups of the separation matrix are predominantly carboxyl, carbonyl, ether, hydroxyl or other groups, which are capable of participating in hydrogen bonding. Carboxyl groups are also easily deprotonated into carboxylate ions, which allows breaking the hydrogen bond simply by increasing the pH to a value above the $pK_a$ value of the carboxylic groups in question, whereby a target substance can be recovered from the present separation matrix. In this context, the term "predominantly" means most of the functional groups which interact with the targets. However, as the skilled person in this field will realise, other groups common to separations media, such as amides and ethers, might also participate in the hydrogen bonding of the target substance(s). Further, in a specific embodiment, there is a small amount of groups capable of other interaction present, such as a small number of ion-exchange groups and groups enabling hydrophobic interaction.

The polymer chains which carry the above discussed functional groups can be any suitable polymer, such as a carbon chain or a carbon chain interrupted by heteroatoms, and it can be unsubstituted or substituted, e.g. by methyl, ethyl, or other alkyl groups, aryl groups etc. Thus, in one embodiment, the polymer is a polyethylene glycol. Further, the functional groups may be coupled to the carbon chain via another group, such as an alkyl or aryl group. Thus, illustrative examples according to the invention of polymer chains carrying functional groups are poly(acrylic) acid, polymethacrylic acid, polyaryl acid, polymalic acid, polymalonic acid, polymalic acid, polyphenol-containing polymers, polyamides, polyvinyl ethers etc. In an advantageous embodiment of the present separation matrix, the polymer chains are predominantly polyacrylic acid or poly(ethylene glycol) chains.

The polymer chains should be of a size sufficient to allow a satisfactory binding of one or more target substances. In one embodiment, each polymer chain is comprised of about 5-1000, and the invention encompasses all sub-ranges there between, such as about 50-500, for example about 100-500 monomer units. The skilled person in this field can select a suitable size of the polymer chain for each case, e.g. considering the risk of a long polymer chain being wound around a smaller sized target molecule. Thus, the size of the polymer chain should be reasonably adapted to the size of the target molecule. As the skilled person will realise, in case of a porous support, the size of the polymer chains will also depend on pore size. The density, i.e. the number of polymer chains per unit area on the support, should be adapted to allow an optimal interaction with target molecules.

In an advantageous embodiment, the separation matrix comprises polymer chains that have been grafted to the carbohydrate. In this field, grafting means that monomers are polymerised in situ at the surface of the support. Grafting can be performed to provide a dense polymeric surface coating. The polymerisation is initiated at reactive groups, such as double bonds, present on the support. Depending on the nature of the support, reactive groups are either already present, e.g. unreacted vinyl groups on a synthetic support, or easily provided e.g. by transforming hydroxyl groups of a carbohydrate support. (For a review of different principles of grafting, see e.g. ref 5). For preparation of synthetic chromatography supports by grafting, see WO03/046063, GE Healthcare Bio-Sciences AB. In an alternative embodiment, the present polymers are prepared separately and coupled to the support using conventional technology. Further specific examples of alternative methods for coupling of polymers to the support are e.g. coupling of reactive compounds such as silanes, pretreatment of the support surface with polymers like polyethyleneimine and then grafting acid groups onto the reactive layer of amines, use of polysiloxane in situ formed coatings etc. The skilled person in this field can adapt the conditions in order to obtain a sufficiently dense surface coverage of the proton donating or accepting groups for the intended application.

According to the invention, the separation matrix is capable of separating haze forming or promoting target substances from other components of a liquid, preferably in liquid chromatography, which target substances contain groups that are rich in oxygen atoms and hence capable of participating in hydrogen bond interactions. A preferred use of such a matrix is clarification of beverages, such as beer.

The interaction surface may be a wide variety of surfaces including new fining agents, filters, chromatography media (packed and expanded bed), etc. A further advantage of the invention, is that use of non-ionic group containing surfaces may allows for CIP treatments of fewer steps, less expensive chemicals, and less harsh conditions, and longer time intervals between needed CIP treatments This might be particularly attractive for some processes and beverage solutions.

EXAMPLES

The present invention will be described in more detail by way of examples, which however are in no way intended to limit the scope of the present invention as defined by the appended claims. All references given below or elsewhere in the present specification are hereby included herein by reference.
Materials and Methods
Polyphenols:

(+) Catechin was purchased from Indofine Chemicals Inc. and dissolved in MILLI-Q™ water (water purification system from Millipore Inc.) to a final concentration of 1 mg/mL. Prodelphinidine B3 was purchased from Sigma Aldrich Co. and dissolved in MILLI-Q™ water to a final concentration of 1 mg/mL. Polyphenol samples were stored at −18° C. before analysis. 50 mM sodium hydrogen carbonate (purchased from Merck KGaA) was prepared and adjusted to pH 4.5 with hydrochloric acid (Merck KGaA). Carbon dioxide is developed when acidifying sodium hydrogen carbonate and the pH increases during storage to maximum pH 6.5. Carbon dioxide bubbles, however, are removed in the degasser unit in the LC system.
Matrices:

SEPHAROSE™ BB was obtained from GE Healthcare Bio-Sciences AB. PolyCM SEPHAROSE™ was produced as described in WO 05/029065. A mixture of 80% SEPHAROSE™ 6FF and 20% polymerised diethylene glycol vinyl ether coated SEPHAROSE™ 6FF (produced as per PolyCM media using diethyelen glycol vinyl ether) was also used. These resins were packed in HR 10/5 columns with 20% ethanol (GE Healthcare Bio-Sciences AB) at 13 mL/min and the gel height was adjusted to 1.3 cm to obtain a final bed volume of 1.0 mL.

Each column packed with chromatography media were equilibrated with 10 column volumes of 50 mM sodium hydrogen carbonate pH 4.5-6.5 (A buffer) at 2 mL/min on a Agilent 1100 system with Diode Array detection (DAD) at 214 nm and 280 nm and a temperature at 4° C. The 1 mg/mL (+) catechin stock solution was diluted to 0.4 mg/mL with A buffer. 25 μL of each polyphenol was injected onto the column and the polyphenols were retarded on the resin isocratically at 2 mL/min and at a temperature of 4° C.
Grafting of di(Ethylene Glycol) Vinyl Ether onto SEPHAROSE™ 6 FF
Allylation Approximately 200 mL SEPHAROSE™ 6 FF (GE Healthcare Bio-Sciences AB), was washed with water on a sintered glass filter. 100 g humid particles and 200 g 50% NaOH (w/w) was added to a 500 mL round-bottom flask equipped with a mechanical stirrer. The stirring was started, and the vessel was immersed in a water bath set at 50° C. The suspension was stirred for 30 minutes.

Figure 2:
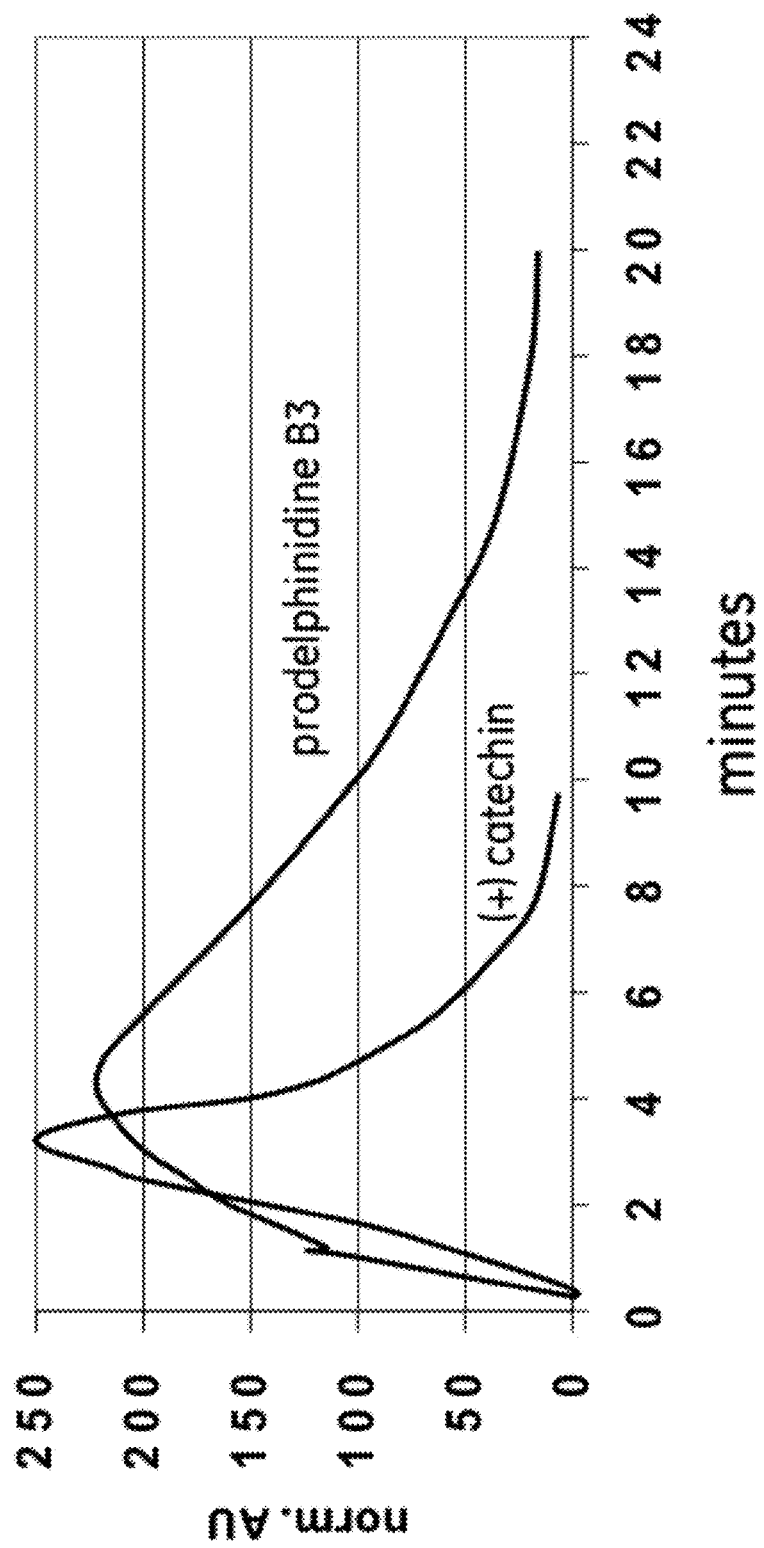
FIG. 2 shows retardation of (+) catechin and prodelphinidine B3 on Poly CM SEPHAROSE™ FF. (+) catechin elutes at 6 mL and prodelphinidine B3 at 8.5 mL.
Figure 3:
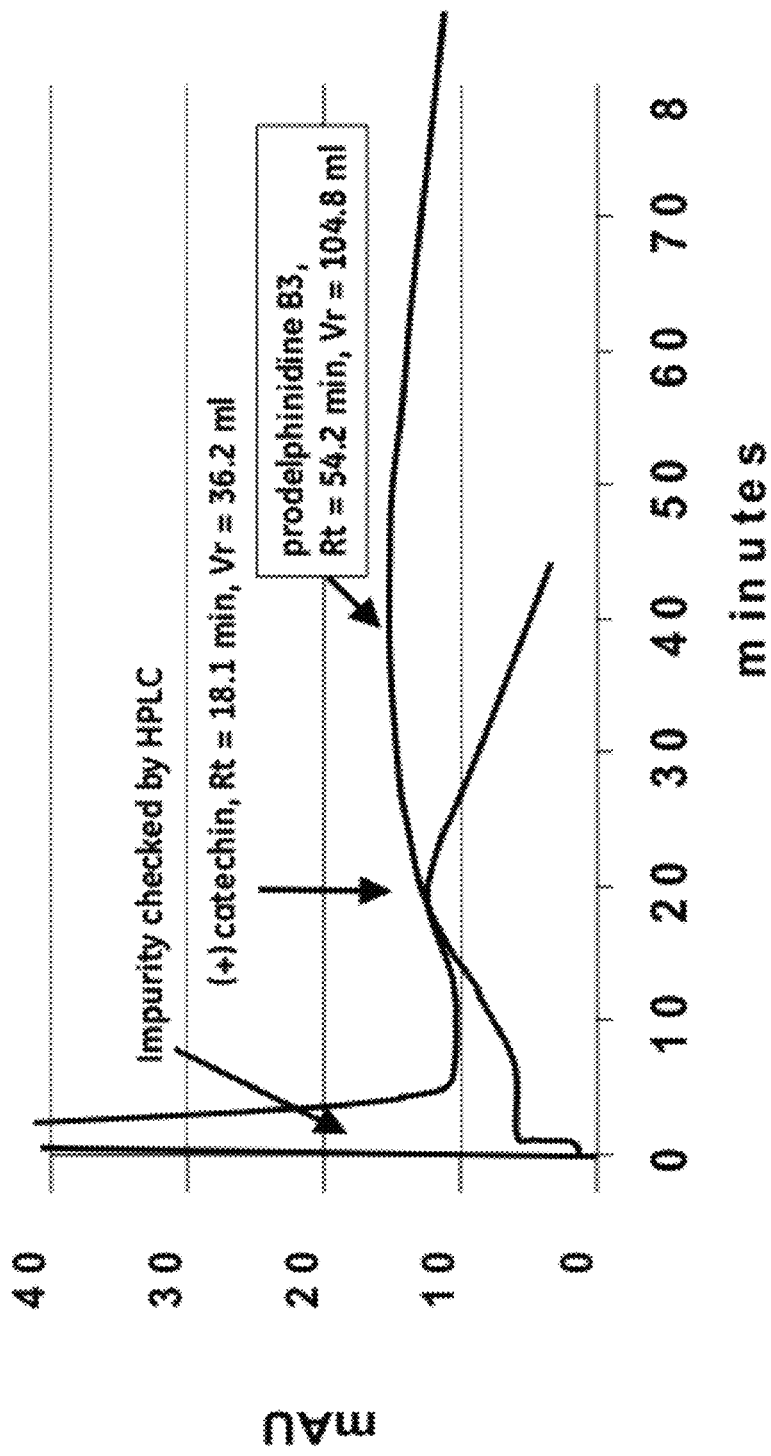
FIG. 3 shows retardation of (+) catechin and prodelphinidine B3 in a column containing a mixture of 80% (v/v) SEPHAROSE™ 6FF particles and 20% (v/v) polymerised diethylene glycol vinyl ether coated SEPHAROSE™ 6FF particles. The latter were reduced to 20% volume of the packed bed simply in order to show their effectiveness in relation to the two media in FIGS. 1 and 2.

400 g Allyl glycidyl ether (available from Sigma-Aldrich) was added, and the stirring rate was increased to obtain a homogeneous suspension. The reaction was left for 18 h at 50° C. The suspension was transferred to a sintered glass filter, and the particles were washed with 1 L of distilled water and 1 L of ethanol.
Radical-Initiated Grafting of di(Ethylene Glycol) Vinyl Ether 10 g of humid allylated SEPHAROSE™ 6 FF prepared as described above was put in a 50 mL injection vial. A solution of 1.6 g 2,2'-azobis(2-methylbutyronitrile) (AMBN, available from Fluka) dissolved in 40 g di(ethylene glycol) vinyl ether (available from Sigma-Aldrich) was prepared. When the initiator was completely dissolved the solution was transferred to the injection vial. The vial was sealed, and shaken to obtain a homogeneous suspension. The vial was thereafter placed in a heating oven set at 70° C. The reaction was allowed to proceed for 18 hours. The vial was opened and the particles were washed on a sintered glass filter with 500 mL of water and 500 mL of ethanol.
Polyphenol Adsorption When injecting (+) catechin and prodelphinidine B3 on different chromatography media all three tested hydrogen bonding media (FIGS. 1-3) had affinity to the polyphenols (FIGS. 1-3). It is shown that all three tested media retarded polyphenols significantly.

The polyphenol retention is indicative of positive interaction with the media (and possibly greater haze formation promoting potential). The nearly eight times greater elution volume of the dimeric polyphenol is suggestive of a much stronger (and therefore selective) interaction for the dimeric than the monomeric polyphenol.

FIG. 3 shows retardation of two different polyphenols on a column containing 80% SEPHAROSE™ 6FF and 20% diethylene glycol vinyl ether coated SEPHAROSE™ 6FF. Selectivity is obtained and the resin show different adsorption properties for the different polyphenols. Since Prodelphinidine B3 is more polar and contains more available OH-groups than (+) catechin the higher affinity of prodelphinidine is obtained. Prodelphinidine is more polar than (+) catechin and if the interaction would be hydrophobic, higher affinity to (+) catechin would be expected. Binding was so strong that using only 20% hydrogen bond media was used in order to reduce the consumption of valuable polyphenol.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

REFERENCES

1. Asano K., Shinigawa K., Hashimoto N., *Characterisation of haze-forming proteins of beer and their roles in chill haze formation*. J. Am Soc. Brew. Chem. 40:147-154, 1982.
2. Siebert K. J., Lynn P. Y., *Comparison of Polyphenol Interactions with Polyvinylpolypyrrolidone and Haze-Active protein*. J. Am Soc. Brew. Chem 56 (1) 24-31, 1998.
3. E Haslam, Practical Polyphenolics. *From structure to molecular recognition and physiological action*, Cambridge university press, Cambridge. ISBN-13 978-0-521-46513-7 pp 164-165.
4. S Hjertén: Biochim Biophys Acta 79(2), 393-398 (1964)
5. P F Rempp, P J Lutz: Comprehensive Polymer Science vol. 6, pp 403-421, Eds. G Allen et al, Oxford 1989.

What is claimed is:

1. A method for haze-clarification of a liquid, comprising removal of polyphenols from said liquid by contacting said liquid with a separation matrix molecularly interacting with polyphenols by hydrogen bonding wherein the separation matrix comprises diethylene glycol based-ligands.

2. The method of claim 1, wherein the separation matrix comprises a polymeric support, wherein at least the surface of the support is substantially hydrophilic.

3. The method of claim 2, wherein the polymeric support is a crosslinked carbohydrate support.

4. The method of claim 2, wherein the polymeric support is a synthetic support in which the surfaces exhibit hydroxyl groups.

5. The method of claim 2, wherein the polymeric support comprises polycarbonyl, polyhydroxy, polyether or polyacid.

6. The method of claim 2, wherein the support is surface-modified with hydrogen bonding groups.

7. The method of claim 6, wherein the hydrogen bonding groups comprise lone-pair electrons and are based on polymers or other ligands containing hydroxyl groups, ether groups, carboxyl groups, carbonyl groups, and/or amine groups.

8. The method of claim 6, wherein the hydrogen bonding groups are ethylene glycol based ligands.

9. The method of claim 8, wherein the ether-ligands are in mixture with other ligands or media.

10. The method of claim 6, wherein the hydrogen bonding groups comprise ethylene glycol or Tris.

11. The method of claim 6 wherein the hydrogen bonding groups comprise part of a responsive polymer or silicone based polymer.

12. The method of claim 2, wherein the support is porous.

13. The method of claim 1, wherein the separation matrix comprises beads, a membrane or a filter.

14. The method of claim 13, wherein the separation matrix has hydrogen bonding and filtration capacity.

15. The method of claim 1, wherein said liquid is a beverage selected from beer, wine, juice or flavourings.

16. The method of claim 15, wherein the liquid is beer and the separation matrix comprises agarose-based chromatography beads.

17. The method of claim 16, wherein the liquid is beer.

* * * * *